United States Patent [19]

Lewis

[11] 3,961,437
[45] June 8, 1976

[54] DOWNRIGGER

[76] Inventor: Gerald F. Lewis, 1850 Columbia, Berkley, Mich. 48072

[22] Filed: Feb. 3, 1975

[21] Appl. No.: 546,207

[52] U.S. Cl. ............................... 43/27.4; 43/43.12
[51] Int. Cl.² .................. A01K 91/00; A01K 89/00
[58] Field of Search ............... 43/27.4, 43.12, 43.11; 242/106

[56] References Cited
UNITED STATES PATENTS

| | | | |
|---|---|---|---|
| 2,730,830 | 1/1956 | Smith | 43/43.12 |
| 2,760,736 | 8/1956 | Mihalko et al. | 43/21 |
| 3,201,890 | 8/1965 | Griggs | 43/27.4 |
| 3,710,501 | 1/1973 | Ware, Jr. | 43/43.11 |
| 3,785,079 | 1/1974 | Rohn | 43/43.12 |
| 3,835,571 | 9/1974 | Berry | 43/43.12 |
| 3,844,058 | 10/1974 | King | 43/27.4 |

Primary Examiner—Warner H. Camp
Attorney, Agent, or Firm—Fisher, Gerhardt & Groh

[57] ABSTRACT

A downrigger for use in controlling the depth in the water of a weight suspended from a boat and detachably carrying a fishing line to a desired fishing depth. The downrigger has a horizontally mounted reel driven through a selectively operable clutch device so that the trolling weight may be lowered by unreeling line or may be raised by winding the reel in the opposite direction. The downrigger may be positioned in selective positions on a boat and the line to the weight is fed through a deep grooved, swivelable pulley facilitating alignment of the trolling line and the downrigger for all of its selected positions. The trolling weight detachably holds the fishing line by a release mechanism which permits the angler to select the amount of pull required for the fishing line to release from the trolling weight.

17 Claims, 9 Drawing Figures

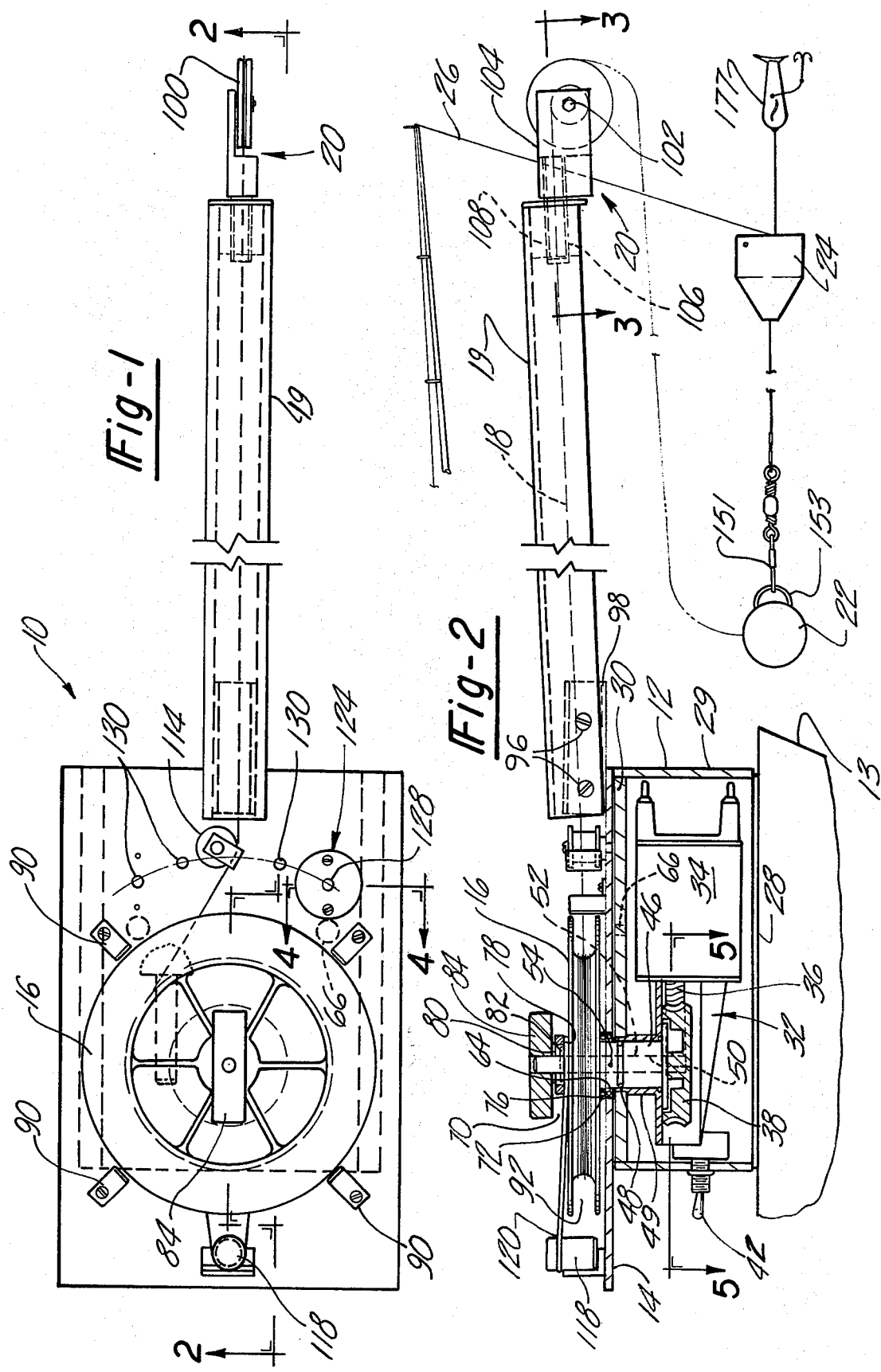

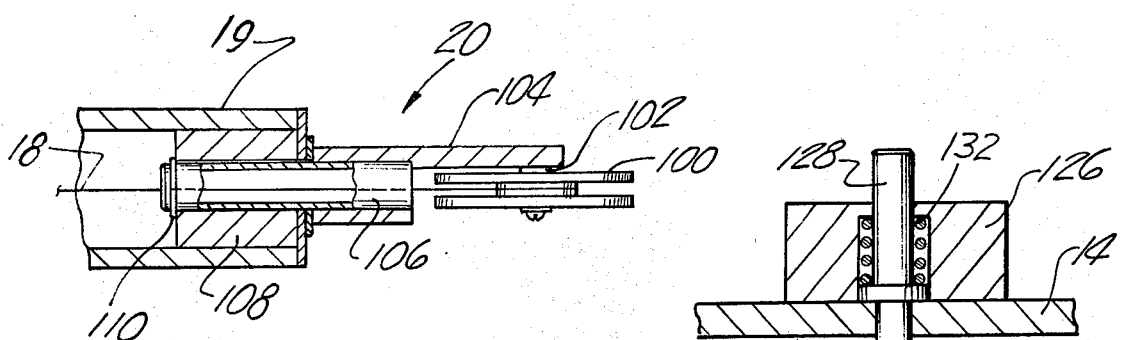
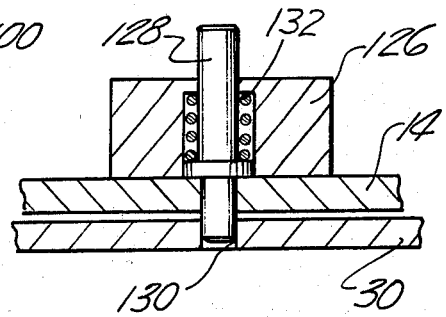
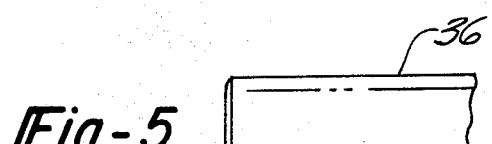
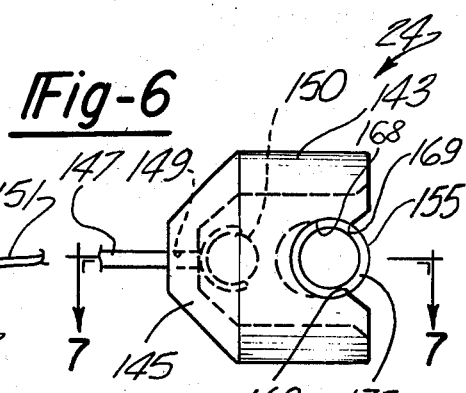
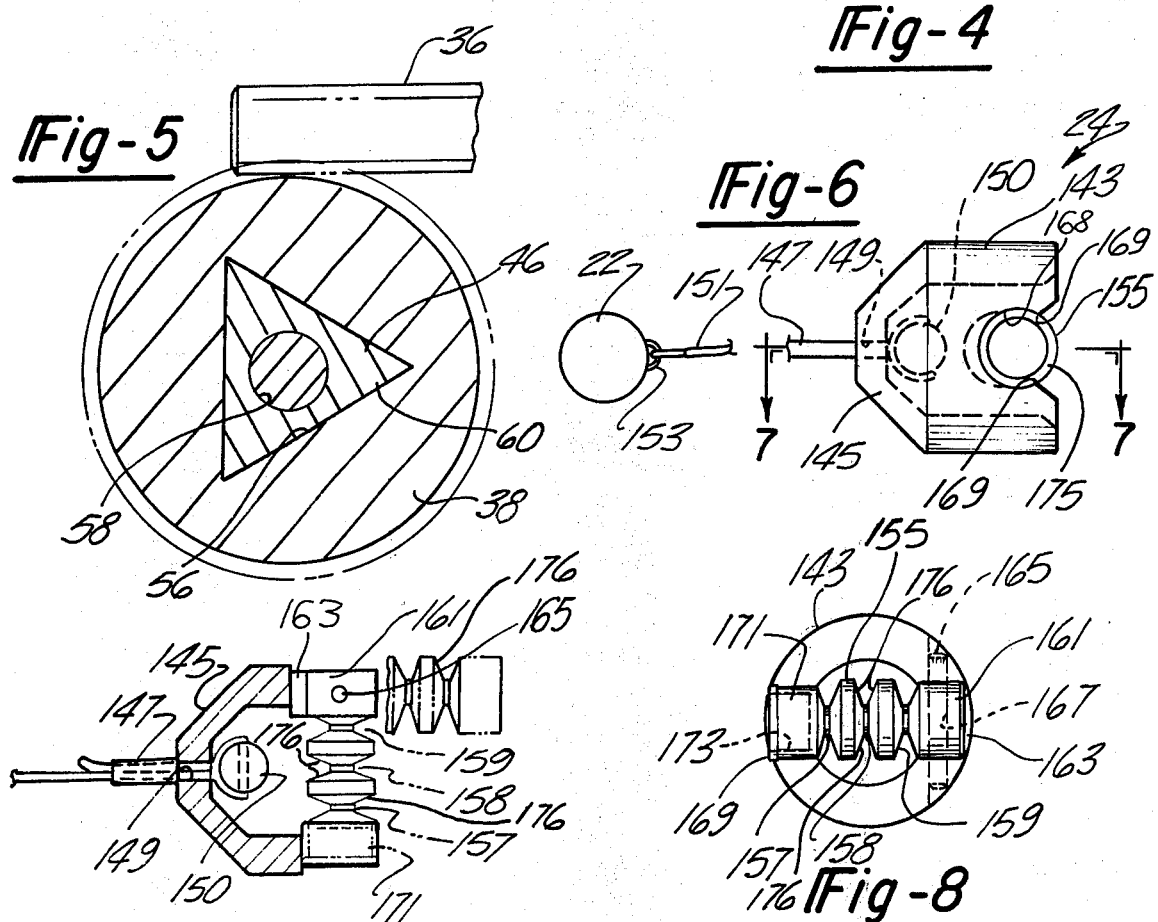
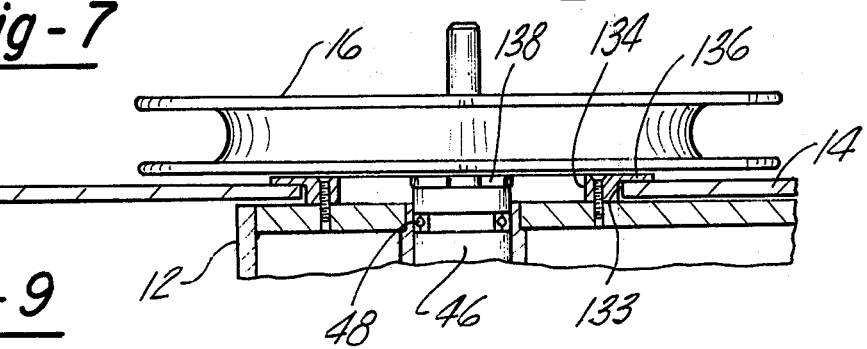

DOWNRIGGER

This invention relates to improvements in downriggers used for fishing.

During trolling for fish from a moving boat downriggers have been used to troll a weight at some selected fishing depth with the weight detachably carrying the fishing line forming a part of the fisherman's tackle to the fishing depth. When a fish strikes the bait attached to the fisherman's tackle the fishing line detaches from the trolling weight so that the fisherman can play the fish without the burden of the heavy trolling weight. Because of the heavy trolling weights which are used, strong trolling lines and motorized mechanisms have been devised to wind and unwind the trolling line with the weight attached. Such motorized mechanisms are bulky, complicated and therefore are usually permanently attached to the boat where they must be separately covered when not in use so that they may be protected from the elements. In addition, because of the permanent attachment, the fisherman is restricted to trolling the line from a fixed position on the boat. Also, the trolling line can be ruptured or the downrigger mechanism damaged if the weight becomes snagged or strikes submerged objects.

Prior downriggers also have provided for the release of the fishing line from the trolling weight when a fish strikes the bait on the fishing line so that the angler may play the fish utilizing only the fishing tackle and independently of the trolling weight. Such devices however, have usually frictionally held the fishing line so that it is pinched and tends to wear upon repeated use causing a weakening of the fishing line. In additon, the force required to release the line is unpredicatable so that the fishing line is retained on the weight even after a fish strikes causing breakage of the fishing line or making it extremely difficult if not impossible to properly play and retrieve the fish.

SUMMARY OF THE INVENTION

With the foregoing in mind a new and different down-rigger is provided that is structurally compact and versatile in operation so as to permit the fisherman to trail his line from different positions relative to the boat.

It is an object of the invention to provide a down-rigger that is power-driven through a selectively adjustable clutch which slips in the event the trolling weight becomes snagged or strikes submerged objects.

It is another object of the invention to provide a downrigger that is selectively adjustable to different positions so that the trolling line can have various positions relative to the boat, the downrigger being provided with a unique line aligning mechanism that adjusts to changes of the position of the downrigger relative to the boat and changes of position of the line during maneuvering of the boat.

Still another object of the invention is to provide a downrigger with a horizontally operated reel which makes for compactness of the structure to facilitate mounting and covering when not in use.

Another object of the invention is to provide a release mechanism for the fishing line which releasably holds the fishing line relative to the trolling weight without pinching the line or causing frictional wear and in which the fisherman may select the amount of force required to release the fishing line from the trolling weight.

DESCRIPTION OF THE DRAWINGS

FIG. 1 is a top plan view of the downrigger embodying the invention;

FIG. 2 is a cross-sectional view of the downrigger taken on line 2—2 in FIG. 1;

FIG. 3 is a cross-sectional view of a portion of the downrigger shown in FIG. 2 at an enlarged scale and taken on line 3—3 in FIG. 2;

FIG. 4 is a cross-sectional view of a lock mechanism embodied in the downrigger;

FIG. 5 is a cross-sectional view of the drive mechanism for the downrigger taken on line 5—5 in FIG. 2;

FIG. 6 is a sdie view of the release mechanism for holding the fishing line relative to the trolling weight;

FIG. 7 is a cross-sectional view similar to FIG. 6 and showing a fish line holding and release position of the release mechanism;

FIG. 8 is an end view of the release mechanism showing in FIGS. 6 and 7; and

FIG. 9 is a view similar to a portion of FIG. 2 showing a modification of the downrigger.

DETAILED DESCRIPTION

Referring to FIG. 1 and 2 a downrigger embodying the invention is designated generally at 10 and includes a housing 12 mounted on a boat indicated at 13. The housing 12 supports a platform 14 and a reel 16 which reels out or reels in a trolling line 18 which extends through an outrigger arm 19 and a guide arrangement 20 to suspend a trolling weight 22 in the water. The trolling weight 22 is provided with a line release mechanism 24 which releasably holds a fishing line 26 relative to the trolling weight 22.

The housing 12 is generally box-like in configuration and comprises a bottom wall 28, side walls 29 and a cover 30. The housing 12 is secured to some selected position on the boat, preferably at the rear thereof, and may be located at either side of the boat or in positions intermediate to the sides of the boat.

A drive mechanism 32 for the reel 16 is secured within the housing 12 to an underside of the cover 30 and includes a reversible drive motor 34, a worm gear 36 and a worm wheel 38. The drive motor 34 rotates the worm gear 36 which revolves the worm wheel 38 at a speed determined by the gear ratio. It will be apparent that other types of gearing can be employed.

The drive motor 34 is energized by a power line and is controlled in accordance with the setting of a conventional off-forward-reverse switch 42 mounted on one of the side walls 29 of the housing 12.

The worm wheel 38 serves to rotate a spindle 46 which is rotatably journaled by a bearing 48, relative to a tubular boss 49 depending from the cover 30. The spindle 46 has an internally threaded hole 50 which receives a threaded stud 52 locked in place relative to the spindle 46 by means of a pin 54. The spindle and stud 52 form a drive shaft for the reel 16.

The drive connection between the worm wheel 38 and the spindle 46 can best be understood by reference to FIG. 5. The worm wheel 38 is provided with a generally triangular cavity 56 having an upwardly projecting pad 58. The lower end of spindle 46 is provided with a triangular portion 60 which is complementary to the triangle recess 56. When the triangular portion 60 of the spindle 46 is engaged in the recess 56 rotational movement of the worm wheel 38 by the worm gear 36 causes a rotation of the spindle 46 and the stud 52.

Referring now to FIGS. 1 and 2, the platform 14 is generally plate-like and is supported in close proximity on top of the housing 12 for swiveling movement about the spindle 46 which is journaled relative to the platform by means of a bearing 64. The weight of the platform 14 is supported relative to the housing 12 by means of a plurality of spaced plastic buttons 66 which have head portions projecting above the upper surface of the cover 30 to engage the bottom surface of the platform 14 and provide a good bearing surface between the platform 14 and housing 12.

The reel 16 is positioned on the stud 52 above the platform 14 and is arranged to be connected to the latter for rotation upon operation of the drive mechanism 32 through means of a clutch designated generally at 70. The clutch 70 includes a clutch ring 72 which is disposed on the stud 52 and is provided with a bearing acting between the ring 72 and the upper surface of the platform 14. An upper surface 76 of the clutch ring 72 is adapted to engage a lower surface of the reel 16. A second clutch ring 78 is disposed above the reel 16 and is mounted on the stud 52. The clutch ring 78 rests on the reel 16 and is provided with a diametrically extending slot 80 which receives a transverse pin 82 passing through the stud 52. During rotation of the spindle 46 and stud 52 the pin 82 serves to rotate the disc ring 78 and at the same time permits axial movement of the latter relative to the stud 52.

A lock handle 84 is threadably engaged with an upper end of the stud 52 so that upon rotation of the handle 84 to advance it downwardly on the stud 52, the clutch rings 72 and 78 are pressed into engagement with opposite sides of the reel 16 and serve to rotate the latter together with the spindle 46 and stud 52.

The reel 16 which serves to store the trolling line 26 is rotated in a clockwise direction as seen in FIG. 1 to dispense the trolling line and in the opposite direction to receive the trolling line. The reel 16 is relatively thin, that is it has an axial width substantially less than the radial dimension and is disposed horizontally in adjacent relation to the upper surface of the platform 14 which serves to make the downrigger assembly very compact with a low profile. The trolling line 18 is retained on the reel 16 by means of a plurality of clips 90 which are fastened to the platform 14 and have an upwardly projecting portion in close proximity to the circumference of the reel to close the groove 92 of the reel and confine trolling line 18.

Trolling line 18 from the reel 16 is fed to the arm or outrigger 19 which is of U-shaped cross-section and has one end fastened by means of bolts 96 or the like to a tubular mounting bracket 98 which is rigidly supported on the platform 14.

The free end of the outrigger or arm 19 supports the trolling line guide assembly 20 which as best seen in FIG. 3, includes a deep grooved pulley 100 which is mounted for free rotation on an axle 102 secured to a bracket member 104. The bracket member 104 is provided with a tubular pintle 106 which is rigidly fastened to the bracket 104 and is rotatably mounted in a block 108 secured in the end of the outrigger arm 19. The end of the pintle 106 is provided with a snap ring 110 or the like to retain the pintle against axial displacement in the block 108. The pulley 100 is disposed on the bracket 104 so that its axis of rotation is slightly below the axis of the pintle 106. As a result trolling line 18 which is threaded through the hollow pintle 106 within the deep groove of the pulley 100 is disposed so that the line 18 is fed more or less tangentially to the root portion 112 of the pulley.

Positioned between the reel 16 and the outrigger arm 19 is a guide roller 114 which is mounted on the top of platform 14 to rotate about a vertical axis. The roller 114 serves to guide line from the reel 16 and to direct it longitudinally of the outrigger 19 to the guide arrangement 20.

Rotation of the reel 16 to dispense or retract trolling line 18 also serves to operate a mechanical counting device 118 which as seen in FIGS. 1 and 2 is mounted on the platform 14. The counter 118 is rotatably driven by means of an endless belt 120 which is trained around a pulley projection on the upper face of the reel 16. As a result, rotation of the reel 16 serves to rotate the mechanical counting device 118. Upon proper calibration, the counting device can be arranged to indicate the length of trolling line 18 which has been dispensed from the reel 16 or the depth to which the trolling weight 22 has been lowered in the water.

During use of the downrigger 10, the platform 14 may be swiveled to various positions relative to the housing 12 and is held in a selected one of its positions by means of a lock device 124 which as seen in FIG. 1 is secured on the top surface of the platform 14 for easy accessability by the user of the downrigger 10. As best seen in FIG. 4, the lock arrangement 134 includes a lock housing 126 mounted on the top surface of the platform 14. The lock housing slidably receives a plunger 128 the lower end of which slidably passing through an opening in the platform 14. The lower end of plunger 128 is receivable in a selected one of a plurality of holes 130 in the cover 30 of the housing 12 which are located on an arc relative to the spindle 46. The upper end of the plunger 128 is used as a handle to move the plunger upwardly against the loading of a spring 132 to disengage the plunger 128 from a selected hole 130 so that the platform 14 may be swung to selected positions relative to the housing 12. After the plunger 128 is released the spring 132 urges it downwardly to mate with a selected one of the holes 130 in the cover 30 to retain the platform 14 in a locked position relative to the housing 12.

Depending on the length of the outrigger arm 19 and the weight 22, large loads can be imposed on the platform 14 and on the bearings and drive shaft formed by spindle 46 and stud 52. An alternative method to the mounting of the platform 14 relative to the housing 12 is shown in FIG. 9 which serves to distribute the loads between the platform 14 and housing 12. The platform 14 is provided with an enlarged opening 133 which receives a bearing ring 134 of relatively large diameter. The ring 134 is bolted to the top surface of the cover 30 of the housing 12 and is formed with a flange portion 136 which extends radially outwardly. The flange 136 engages the top surface of the platform 14 and loads transmitted by the weight 22 and the outrigger arm 19 to the platform 14 are therefore absorbed by the flange 136 which is spaced a substantial distance from the axis of the drive spindle 46. When the alternative construction is used, the clutch ring 72 does not require a bearing and a clutch ring 138 in the form of a generally plain washer is used which rests on top of the spindle 46. During operation of the clutch 70, the clutch rings 78 and 138 act between the end of the spindle 46 and lock handle 84 whereas the clutch rings 72 and 78 in FIG. 2 act between the platform 14 and handle 84.

Referring now to FIG. 6, the weight 22 has attached thereto the line release mechanism 24. The release mechansim 24 has a generally hollow cylindrical housing 143 which in its trolling positions is open at its rearward end and has a conical forward surface 145. The housing 143 is connected to a wire leader 147 which passes through an axial opening 149 in the conical portion 145 of the housing 143 and is secured thereto by means of a ball 150 swaged on the end of the wire 147 and disposed within the housing to permit the housing to rotate relative to the wire. The opposite end of the wire 147 is provided with a snap element 151 which may be detachably connected to a mounting eye 153 rigidly connected to the weight 22.

The housing 143 supports a line holding spool 155 which is generally cylindrical and is provided with a plurality of spaced annular grooves 157, 158 and 159. One end 161 of the spool 155 is disposed in a recess 163 formed in a wall of the housing 143. A pin 165 extends generally tangentially of the housing 143 through an opening 167 in the end 161 of the line holding spool 155 and the opposite ends of the pin 165 are disposed in press fit engagement in aligned openings in the wall of the housing 143. The pin 165 permits the line holding spool 155 to pivot from a position in which its axis is generally transverse to the leader 147 as seen in FIG. 7 to the position shown in phantom line. In the latter position, the axis of the holding spool 155 is disposed generally parallel to the line 147.

The housing 143 is provided with a recess 168 diametrically opposite the recess 163 which opens rearwardly of the housing 143. The recess 168 forms a pair of spaced lip portions 169 which are spaced apart a distance slightly less than the maximum diameter of the spool 155 at its end 171. When the line holding spool 155 is disposed in the full line position shown in FIG. 7 with its axis transverse to the leader 147, the lips 169 act to retain the end 171 in the recess 168. The end 171 of the line holding spool 155 has a blind bore 173 which forms a thin wall 175 at the end 171 of the line holding spool. The spool 155 and housing 143 are preferably made of plastic material and the wall 175 deflects under certain conditions of operation to permit release of the line holding element 155 for movement from the full line position shown in FIG. 7 about its pivot pin 165 to the phantom line position.

The spool 155 serves to receive a fishing line 26 from a fisherman's pole which is wound around a selected one of the annular grooves 157, 158 or 159. Each of the grooves has tapered side walls 176 which converge toward each other radially inwardly of the grooves. Preferably, the fishing line 26 is wound on the spool for three or more turns with the first turn of line being wedged into the bottom of the groove by the subsequent turns. This is sufficient to maintain the line on the spool against the resistance of the bait being trolled. When the line release mechanism 24 is disposed relative to the weight 22 in a trolling position as shown in FIG. 6 and the fishing line 26 is wound around the spool 155, a fish striking the bait 177 will cause a pull to be exerted on the spool 155. When the force reaches a sufficient level, the end portion 171 of the spool 155 will snap out of the recess 168 and will pivot about the pin 165. The spool will then be disposed with its axis generally parallel to the line 147 and the trailing fishing line and the line 26 will be free to unwind from the spool and to become released therefrom. Thereafter, the fisherman plays the fish in a normal manner, free of the release mechanism 24 and the weight 22.

Referring to FIGS. 7 and 8 it will be noted that the grooves 157, 158 and 159 are spaced different distances from the pivot pin 165. By selecting the proper one of the grooves in which to wind the fishing line the user determines the amount of pull on the bait which will be required to unlatch the spool 155. For example, if the spool 155 is to be released with a minimum amount of pull the line is wound in the groove 157 adjacent the end 171. In this position the pull on the line required to unsnap the spool 155 might be to the order of five pounds which is the product of the distance of the groove 157 from the pivot 165. On the other hand if the fisherman should want a greater force to be developed before the spool 155 will release, the line can be wound on the annular groove 159 adjacent to the pivot 165. In this instance, a considerably larger force will be required to release the spool which is the product of the distance of the annular groove 159 from the pivot 165.

The spacing of the grooves 157, 158 and 159 can be unequal or equal and can be easily calibrated to determine the load required to snap the spool 155 to an open position. This is accomplished by determining the load required to force the end of the spool 171 between the lips 169 and by spacing the grooves 157, 158 and 159 relative to the pivot pin 165 to represent different unlatching loads, for example 5, 10 and 20 pounds of pull for the grooves 157, 158 and 159, respectively. This makes it possible for the fisherman to select the releasing force to correspond to the type of bait, test strength of line 173, and size of the fish he is seeking to catch. The releasing force is accurately predictable and will permit release at the selected load level without pinching or unnecessarily loading the line. Also, it will be noted that in its line holding or latched position, the spool with the coils of fishing line is disposed within the housing where the spool and coils of line are protected from fouling on weeds or like.

To use the downrigger assembly 10, the angler attaches his fishing line 26 to the release mechanism 24 as previously described and the release mechanism is attached to the weight 22. The weight 22 and attachments are suspended from the end of the arm 19 above the water. If desired, the platform 14 may be swiveled to selected positions relative to the housing 12 and therefore to the boat by unlocking and moving the platform to selected positions to locate the arm 19 in a desired relationship relative to the boat. After the desired position is selected, the lock pin 128 may be released to engage into a selected one of the openings 130 in the housing cover plate which will act to retain the platform in the selected position. Thereafter, the trolling weight 22 may be lowered into the water to carry with it the release mechanism 24 and the angler's fishing line 26 by employing the motor drive or by permitting the mass of the trolling weight to carry the trolling line 18 and fishing line 26 downwardly. When relying only on the trolling weight 22 the clutch or lock handle 84 is released to move it upwardly and thereby release the frictional engagement of the clutch rings 72 and 78 or 72 and 138 with the reel 16 after which the reel 16 is free to rotate about its axis on the stud 52 to dispense the trolling line 18 from the reel. The rotation of the reel 16 drives the counter 118 and when the desired depth is indicated, the lock handle 84 may be tightened to restore the frictional grip between the clutch rings and the reel 16. Since the upper clutch ring 78 is prevented from rotating by the stationary stud 52 and by the driving mechanism, tightening of the lock handle 84 serves also to prevent rotation of the reel 16 and prevents further release of the trolling line. To use power to dispense the line 18, the handle 84 is tightened to engage the clutch rings with the reel 16 and thereafter the switch 42 is operated to energize the drive motor 34 and rotate the reel 16 in the appropriate direction. The line 18 will be dispensed around the guide roller 114 longitudinally of the arm 19 and through the guide mechanism 20. The rotating reel 16 will serve to drive the counter 118 to indicate the desired depth of the trolling weight 22.

It will be noted that if the arm 19 is extending generally longitudinally to the direction of movement of the boat, the guide mechanism 20 will assume the position shown in FIG. 2 in the drawings. However, if the outrigger arm is disposed to one or the other side of the boat, the line 18 will serve to move the pulley 100 on the axis of the pintle 106 by engagement of the line with the sides of the deep groove of the pulley so that proper alignment is maintained between the line 18 in the water and the pulley which for all swivel positions serves to feed the trolling line generally longitudinally of the arm 19.

Lowering of the weight 22 into the water will serve to carry the release mecahnism 24 together with the angler's fishing line 26 to the selected depth. In the event that a fish strikes the bait on the fishing line, the spool 155 of the release mechanism will move from its transverse position in which it is being trolled to a position in which it extends generally parallel to the direction of movement of the release mechanism. In that latter position the line will be free to unwind from the spool and the bait together with the fish will be free of the trolling weight 22 after which the angler may play the fish independently of the trolling weight.

To remove the trolling weight 22 from the water the switch 42 is actuated to cause rotation of the reel 16 in a counter-clockwise direction as viewed in FIG. 1 so that the trolling line 18 is rewound on the reel 16. Such rotation causes the counter 118 to return towards its initial zero reading at which point the switch 42 may be actuated to its off position and the trolling weight 22 will be suspended out of the water.

The clutch mechanism 70 may be utilized to prevent breakage of the trolling line in the event that the trolling weight 22 becomes snagged or hits submerged objects. The reel 16, which preferably is of a plastic material, is frictionally secured between the clutch rings by adjustment of the clutch mechanism 70. If the trolling weight 22 hits an object or becomes snagged, the force exerted on the trolling line will increase causing the reel 16 to slip between the disc washers and the reel will permit the line to be unreeled until steps can be taken to free the weight. The clutch mechanism 70 can be adjusted to permit reel slippage to occur at whatever level of force the operator feels can be tolerated. To make the necessary adjustment all that is required is to adjust the handle 84 and manually pull the trolling line to test the force required to cause the required slippage.

When the downrigger assembly 10 is not in use, the weight 22 is retracted from the water after which the platform 14, which can rotate a full 360° relative to the housing 12, may be moved to a selected position. This makes it possible to swing the arm 19 so that it is inboard of the boat or parallel to the boats transom, or any other position convenient for storage. Such positioning together with the low profile of the horizontally disposed reel 16 makes for convenience in storage and covering to protect the downrigger assembly 10 from the elements.

A downrigger assembly has been provided in which a reel for dispensing trolling line is disposed generally horizontally to rotate about a generally vertical axis. The reel arrangement makes for compact unit which may be mounted in selected positions on a boat and in its mounted position may be adjusted to swing an arm to selected positions. In the selected positions the trolling weight will be trailed from the boat and the line itself will act to adjust a guide means at the end of the arm to maintain the line in alignment with the arm. The trolling weight is used to carry a fish line release mechanism to some selected depth and the fish line is attached to the release mechanism in any one of several selected positions to determine the force required to cause the fish line to become released from the trolling weight. After release of the fish line from the release mechanism the angler is free to reel in his line independently of the trolling mechanism.

The embodiments of the invention in which an exclusive property or privilege is claimed are defined as follows:

1. A downrigger for controlling the depth of a trolling weight suspended by a line from a boat, the combination of: a housing adapted to be supported on a boat, a shaft rotatably supported by said housing and extending vertically therefrom, a reel for receiving and dispensing line mounted on said shaft for rotational movement relative thereto on a generally vertical axis relative to the boat, an elongated arm supported relative to said housing and extending therefrom for swinging movement in a full arc about said vertical axis and relative to the housing, guide means at the free end of said arm for receiving the line from said reel and guiding the line away from the boat, motor means for rotating said shaft, and clutch means drive connecting said shaft to said reel and being selectively adjustable between positions permitting free rotation of said reel relative to said shaft and releasably connecting said reel to said shaft for rotation therewith and for release therefrom in response to a selected load on said weight.

2. The combination of claim 1 in which said guide means includes a pulley for receiving line and being rotatable about an axis transverse to said arm, and mounting means for said pulley connected to said arm for swivelling movement about an axis extending generally longitudinally of said arm.

3. The combination of claim 2 in which said pulley forms a groove having a substantial depth, the walls of said groove receiving the line therebetween for moving said mounting means about its axis upon changes of position of said arm relative to a line being trolled.

4. The combination of claim 1 and further comprising a weight member connected to the end of said line and means for detachably connecting a second line to said weight member.

5. The combination of claim 4 in which said means releasably connecting said second line comprises a housing, a leader means connecting said housing in spaced relationship to said weight member and affording rotational movement of said housing relative to the axis of said leader means, a spool element pivotal relative to said housing between a first position in which said spool member is disposed transversely to the direction of trolling motion and a second position extending generally parallel to the direction of motion, said spool being adapted to receive coils of said second line, and means releasably holding said first position to retain said second line on said spool.

6. The combination of claim 1 in which said clutch means includes a clutch ring mounted on said shaft for rotation therewith and for axial movement relative thereto, and means for moving said clutch ring axially into engagement with said reel for frictionally locking the latter to said shaft.

7. The combination of claim 6 in which said shaft had a shoulder portion and in which said clutch ring is movable axially to frictionally engage said reel with said shoulder portion on said shaft.

8. The combination of claim 1 and further comprising a platform mounted on said housing and being swingable relative thereto about the axis of said shaft, said arm being supported from said platform for movement therewith.

9. The combination of claim 8 and further comprising lock means between said platform and housing for maintaining said platform in a selected position relative to said housing.

10. The combination of claim 8 in which said clutch means includes a first ring disposed between said reel and said platform, a second ring mounted on said shaft for rotation therewith and for axial movement relative thereto, and means for moving said second ring relative to said first ring for holding said reel relative to said shaft.

11. The combination of claim 8 in which said platform is generally planar, said reel having an axial dimension substantially less than its radial dimension and being disposed to rotate in a plane parallel to and in close proximity to said platform to offer a low profile for said downrigger.

12. The combination of claim 1 and further comprising counter means for indicating revolutions and means operably connecting said reel and said counter means for rotatably actuating the latter in response to rotational movement of said reel.

13. A line release mechanism for use with a trolling weight comprising, a housing, a leader means adapted for connection to said weight and being connected to said housing for free rotational movement axially of said leader means during directional movement through the water, a fish line receiving spool pivotally mounted in said housing for movement from a first position in which the axis of said spool is transverse to said directional movement of said housing to a second position in which the axis of said spool is generally parallel to said directional movement of said housing, said spool receiving coils of the fishing line to retain said line on said spool in said first position and to release said coils in said second position to free said line from connection with said housing and weight.

14. The combination of claim 12 in which said spool is pivotally mounted adjacent one end relative to said housing, and latch means formed by said housing and being engageable with an opposite end of said spool for releasably holding the latter in said first position.

15. The combination of claim 12 in which said spool is pivotally mounted adjacent one end and forms a plurality of fishing line receiving means spaced varying distances from said one end and in which coils of fishing line may be selectively disposed to control the release force from said spool.

16. A line release mechanism for use with a trolling weight comprising, a housing for directional movement through the water, a fish line receiving spool pivotally mounted relative to said housing for movement from a first position in which the axis of said spool is transverse to said directional movement of said housing to a second position in which the axis of said spool is generally parallel to said directional movement of said housing, said spool forming a plurality of fishing line receiving means selectively receiving coils of the fishing line to retain said line on said spool in said first position and to release said coiled line in said second position, said fishing line receiving means being formed by a plurality of annular grooves in said spool and in which said coils of fishing line are disposed in a selected one of said grooves.

17. The combination of claim 16 in which said grooves have tapered side walls so as to form a wedging relationship with the said coils of fishing line.

* * * * *

UNITED STATES PATENT OFFICE
CERTIFICATE OF CORRECTION

Patent No. 3,961,437    Dated June 8, 1976

Inventor(s) Gerald F. Lewis

It is certified that error appears in the above-identified patent and that said Letters Patent are hereby corrected as shown below:

Column 1, line 46, after "a" delete "down-rig-" and insert --downrig- --.

Column 4, line 28, after "arrangement" delete "134" and insert --124--.

Column 5, line 3, delete "mechansim" and insert --mechanism --.

Claim 7, column 9, line 13, after "shaft" delete "had" and insert --has--.

Signed and Sealed this

Twelfth Day of October 1976

[SEAL]

Attest:

RUTH C. MASON
*Attesting Officer*

C. MARSHALL DANN
*Commissioner of Patents and Trademarks*